Oct. 14, 1930.   B. G. KLUGH   1,778,393
FEED CONTROL MEANS FOR BINS, HOPPERS, ETC
Filed May 6, 1926
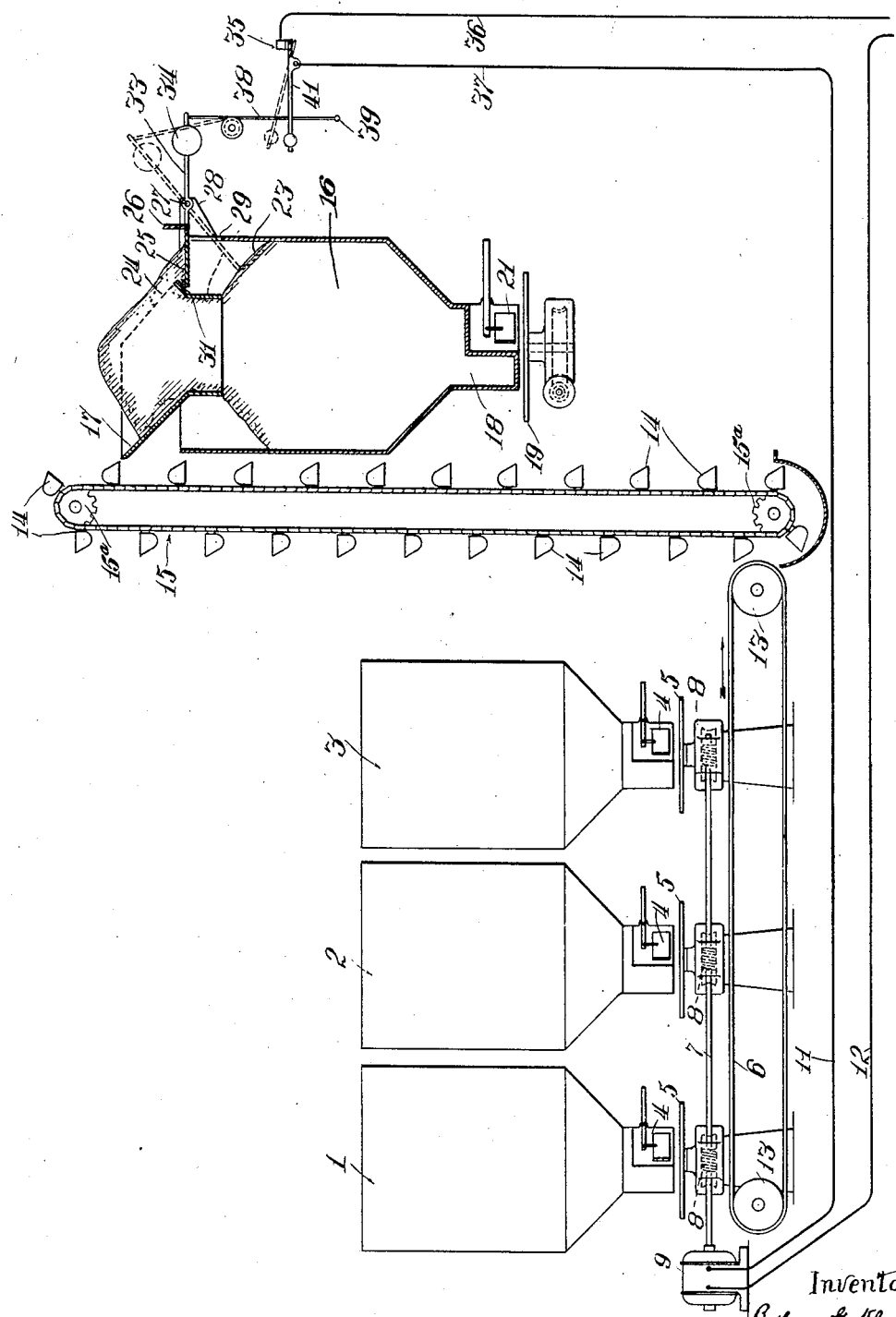
Witness
M. C. Lenoir
Inventor
Bethune G. Klugh.
by John L. Jackson.
Attorney Patented Oct. 14, 1930

1,778,393

UNITED STATES PATENT OFFICE

BETHUNE G. KLUGH, OF CHICAGO, ILLINOIS, ASSIGNOR TO AMERICAN ORE RECLAMATION COMPANY, OF NEW YORK, N. Y., A CORPORATION OF NEW YORK

FEED-CONTROL MEANS FOR BINS, HOPPERS, ETC.

Application filed May 6, 1926. Serial No. 107,031.

The present invention relates to feed control means for bins, hoppers, etc. More specifically, the invention pertains to means for automatically controlling the feed to a bin, hopper or the like, in accordance with the quantity of material in the bin or the rate of discharge therefrom. The invention has a wide field of utility in various systems designed for handling sub-divided solid material, such as ore, coal, grain, ashes, etc., where it is desired to maintain a definite quantity of such material in a particular receiving bin.

For example, in many industries it is customary to handle bulk materials from a source or group of sources, such as feed hoppers or storage bins, and to feed such materials therefrom at a more or less definite rate of volume or weight—or to feed several classes of materials in definite proportions and at a definite rate—and to deliver such materials to an intermediate storage receptacle. The feeding devices in such systems usually tend to feed a greater or less volume of material into the receiving bin than is taken therefrom, with the result that the receiving bin either overflows or runs empty. It is furthermore often necessary that such bulk materials be fed from their source or sources at intermittent rates, while the material is being taken from the receiving bin at a regular rate. Also, such bulk materials may be fed from both the source and the receiving bin at different rates, either intermittently or continuously.

As above stated, in each of these instances difficulty is usually had in maintaining a constant level or definite charge of material in the receiving bin so as to prevent this bin from overflowing or becoming empty. The fundamental object of the present invention is to provide improved means for automatically maintaining the material in the receiving bin at a substantially constant level, regardless of the rate at which such material is drawn therefrom, by automatically controlling the feed from the source or sources of supply.

In the accompanying drawing I have illustrated a representative embodiment of my invention having a particular combination of feeding apparatus, but it will be, of course, understood that the system therein disclosed, and particularly the feeding apparatus and the control exercised over the same is merely exemplary and can be varied widely within the purview of the invention. The system shown is typical of that employed in ore sintering plants. Three supply bins containing three different classes of materials are indicated at 1, 2 and 3. These materials are fed therefrom through controllable gates 4 upon feeding discs 5 from which the materials are spread upon a conveyor belt 6. The proportions from the respective bins 1, 2 and 3 may be varied by giving the gates 4 of these bins different settings. The feeding or spreading discs 5 are all driven from a common shaft 7 which has a worm drive connection 8 with each disc. This shaft is driven from an electric motor 9 supplied with current from a power circuit 11, 12.

The conveyor belt 6 passes over end pulleys 13, one of which pulleys may be driven from the electric motor 9 through suitable power transmission mechanism, or this pulley may be driven from any other source of power. The conveyor belt 6 discharges its material into the buckets 14 of an elevator 15 which passes over end sprockets 15$^a$. This elevator may also be driven from the electric motor 9, or from any other source of power. The buckets 14 of this elevator discharge the material into the receiving bin 16, wherein is embodied the particular control feature constituting the present invention. As hereinbefore stated, the feeding apparatus consisting of the conveyor belt 6 and the elevator 15 is merely shown to illustrate a typical adaptation of my invention, and in other installations may assume various other forms in accordance with the requirements of the particular installation.

The receiving bin 16 has an upper inlet chute 17 which receives the material fed from the elevator 15 or other feeding means. The material is discharged from the receiving bin through a lower outlet 18, which may discharge to any suitable point of dumping or to any suitable apparatus intended to receive such material. As illustrative of the latter I have shown a spreading disc 19 on to which the material is discharged under the control of a gate 21.

The lower end of the inlet chute 17 terminates somewhat below the top of the bin 16 so that the main charge of material accumulating up to the lower edge of the chute will assume an angle of repose or slope extending down from this end of the chute, as indicated at 23. One side of the inlet chute 17, preferably the side remote from the elevator 15, is cut away to form an overflow outlet 24. All material discharged from the elevator 15 will tend to drop through the chute 17 down into the bin, but after the bin and chute have become filled to approximately the level indicated the additional material discharged from the elevator 15 will overflow through this overflow side of the chute.

Extending from this overflow edge 24 is a tripping member 25 which is constructed in the form of a plate extending substantially horizontally across the top of the bin directly below the overflow edge 24. A flange 26 rises from the outer edge of this tripping plate to prevent the overflow discharge of material from dropping off the outer edge of the plate. This plate is pivoted on a pivot shaft 27, preferably disposed on brackets 28 extending outwardly from the side of the bin 16. When pivoted as shown, the upper edge of the bin, directly below this plate, is cut away as indicated at 29 to permit the downward tilting movement of the tripping plate, the lower edge of this cut away portion 29 serving as a stop for limiting this tilting movement. The free edge of this tripping plate normally engages against the under side of an angle bar 31 secured to the overflow lip 24, being held in this position by any suitable counterbalancing means, such as a counterbalancing arm 33 having a counterweight 34 adjustably mounted thereon.

As soon as sufficient overflow material has accumulated on the tripping member 25 to overbalance the counterweight 34 this tripping member tilts down to a tripping position, as indicated in dotted lines. It is this movement of the tripping member which is utilized to control the feed mechanism associated with the receiving bin. In the particular arrangement shown, this control is exercised over the motor circuit 11, 12 so as to interrupt the further feed of material on to the conveyor belt 6. To this end the tripping member has a lost motion connection, or any other suitable form of connection, with a switch 35 which is interposed in leads 36, 37 cut in one side of the motor circuit. The extending arm 33 is provided with a link 38 having a projection 39 at the lower end thereof adapted to strike the underside of a counterweighted switch arm 41 and move this switch arm to open circuit position when the tripping member moves downwardly. The lost motion relation between the link 38 and the switch arm 41 permits the tripping member to attain sufficient rapidity of movement before actuating the switch arm to open the switch with a snap motion.

It will be observed that the arc of movement of the free edge of the tripping plate closely follows the natural angle of repose of the material in the bin. When the tripping plate reaches the lower limit of its movement some of its overflow accumulation of material will be precipitated down on the material in the bin, but the major portion of this overflow accumulation will remain held between the tripping plate and the adjacent side of the chute 17, as indicated in dotted lines, this overflow accumulation being supported in this position by the main charge of material in the bin. Hence, the tripping plate will be held in this tripped position with the feeding mechanism inert as long as the main charge of material is contained in the bin to the level indicated. As material is drawn from the receiving bin this level or angle of repose 23 will recede, finally allowing the overflow accumulation to drop down past the edge of the tripping plate and allowing this tripping plate to move back to normal position for again setting the feeding apparatus into operation. It will thus be seen that this tripping apparatus will operate to maintain a substantially constant charge of material in the bin.

Where the electric motor 9 is utilized to drive the conveyor belt 6 and the elevator 15, the interruption of the motor circuit will also interrupt operation of these particular feeding mechanisms. This is illustrative of the numerous other control arrangements which may be employed in connection with the tripping member 25. For example, the tilting of the tripping member may be arranged to disengage a clutch between the motor and any of these feeding mechanisms, either electrically or mechanically. Moreover, in other instances where the discharge from the receiving bin 16 is more or less constant the control means may be so arranged as only to diminish the rate of feed to the receiving bin rather than to entirely interrupt the feed.

Having thus described my invention, what I claim as new and desire to secure by Letters Patent is:

1. In combination, a bin, automatically controlled means for intermittently feeding material thereto, and means for controlling the intermittent operation of said feeding means in response to the overflow discharge from a portion of said bin, said control means having a normal position and a feed controlling position, and means to retain the overflow material resting upon said control means whereby the latter is held in its feed controlling position until the level in said bin recedes.

2. In combination, a bin, means for feeding material thereto, a tripping plate adapted to have said material accumulate thereon after said bin has received a predetermined charge, said plate having a normal position and a feed controlling position, retaining means for holding the accumulated material on said plate with the plate held in its feed controlling position by the weight of said accumulated material until the level in said bin recedes sufficiently to permit the accumulated material to move clear of said plate, and feed control means responsive to the position of said plate.

3. In combination, a bin, means for feeding material thereto, a tripping member adapted to receive an overflow accumulation of material after said bin has received a predetermined charge, an electric motor for operating said feeding means, a switch in the circuit of said motor, motion transmitting means operatively connecting said tripping member with said switch, and means for automatically restoring said switch to closed position when said tripping member resumes its normal position, said motion transmitting means comprising a lost motion connection for obtaining a quick opening of said switch.

4. In combination, a bin, an inlet chute having its lower end discharging into said bin, means for feeding material to the upper end of said chute, one side of the upper portion of said chute being lower than the other to form an overflow edge, a tripping plate disposed adjacent to said overflow edge and adapted to have the overflow material deposited thereon, and means responsive to the movement of said tripping plate for controlling said feeding means.

5. In combination, a bin, automatically controlled means for intermittently feeding material thereto, a tripping plate adapted to have said material accumulate thereon after said bin has received a predetermined charge, means actuated by the downward movement of said plate under the weight of said accumulated material for controlling said feeding means, and means for cooperating with said tripping plate for retaining the overflow material resting thereon, whereby it is held in its downward position by said accumulated material until the predetermined charge in said bin has been diminished.

6. In combination, a bin, means for feeding material thereto, an inlet chute to deliver the material from said feeding means into said bin, said chute having one side of the upper portion thereof cut away to form an overflow edge, a tripping member adapted to receive overflow material from the overflow edge of said chute, said tripping member being supported to swing downwardly into contact with the charge of material in said bin, whereby the overflow material on said tripping member will be prevented from moving clear of said member, holding the same in tripped position until the charge in the bin has receded, and feed control means responsive to the downward movement of said tripping member and adapted to be restored automatically to normal condition when said tripping member resumes its normal position.

7. In combination, a bin, an inlet chute having its lower end discharging into said bin, means for feeding material to the upper end of said chute, said chute having one side of the upper portion thereof cut away to form an overflow edge, a tripping plate extending substantially coextensively and horizontally from said overflow edge for receiving overflow material therefrom, said tripping plate being pivotally supported to allow the dumping edge thereof to swing downwardly into the space between said chute and the adjacent side wall of said bin, and into contact with the material in said bin, said tripping plate being held in tripped position by the overflow material thereon until the charge of material in said bin recedes, and means responsive to the movement of said tripping plate for controlling said feeding means.

8. In combination, a bin, a tripping plate pivotally supported relatively to said bin to dump material accumulating thereon into said bin, an inlet chute having a lower discharge portion discharging into said bin, one wall of said discharge portion being disposed in spaced relation to the adjacent wall of the bin to provide a space into which said tripping plate can swing downwardly to dump the material accumulated thereon, and means for feeding material to the upper portion of said chute, one side of the upper portion of said chute being of low height to form an overflow edge to discharge overflow material upon said tripping plate, the latter being actuated downwardly by said overflow material into contact with the charge of material in said bin, said tripping plate being retained in tripped position until the level of the material in said bin has receded, and feed control means responsive to the downward movement of said tripping plate for controlling said feeding means and adapted to be restored automatically to normal position when said tripping plate resumes its normal position.

BETHUNE G. KLUGH.

CERTIFICATE OF CORRECTION.

Patent No. 1,778,393.                        Granted October 14, 1930, to

BETHUNE G. KLUGH.

It is hereby certified that error appears in the printed specification of the above numbered patent requiring correction as follows: Page 2, line 125, claim 1, after the word "means" insert the word "tending"; and that the said Letters Patent should be read with this correction therein that the same may conform to the record of the case in the Patent Office.

Signed and sealed this 9th day of December, A. D. 1930.

(Seal)                            M. J. Moore,
                                  Acting Commissioner of Patents.